(12) United States Patent
Lee et al.

(10) Patent No.: US 11,469,619 B2
(45) Date of Patent: Oct. 11, 2022

(54) SIGNAL POWER MANAGEMENT CIRCUITS AND SMART CARDS INCLUDING THE SAME

(71) Applicant: Samsung Electronics Co., Ltd., Suwon-si (KR)

(72) Inventors: Ju Ri Lee, Suwon-si (KR); Jun Ho Kim, Seoul (KR)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 17/318,129

(22) Filed: May 12, 2021

(65) Prior Publication Data

US 2021/0408829 A1  Dec. 30, 2021

(30) Foreign Application Priority Data

Jun. 24, 2020 (KR) .................. 10-2020-0076883
Jan. 5, 2021 (KR) .................. 10-2021-0000924

(51) Int. Cl.
*H02J 50/00* (2016.01)
*H02J 50/12* (2016.01)
(Continued)

(52) U.S. Cl.
CPC ............ *H02J 50/12* (2016.02); *G06K 7/0008* (2013.01); *G06Q 20/20* (2013.01); *G06Q 20/322* (2013.01);
(Continued)

(58) Field of Classification Search
CPC .................................. H02J 50/00; H04B 5/00
See application file for complete search history.

(56) References Cited

U.S. PATENT DOCUMENTS 8,284,055 B2  10/2012  Butler et al.
8,841,890 B2   9/2014  Ochoa et al.
(Continued)

FOREIGN PATENT DOCUMENTS

EP     1058376 A2      12/2000
JP     2012216034 A  * 11/2012  ............. G05F 3/242
WO    2013140505       9/2013

OTHER PUBLICATIONS

"European Search Report corresponding to European Application No. 21175016.1, dated Nov. 18, 2021, 5 pages".

*Primary Examiner* — Adi Amrany
(74) *Attorney, Agent, or Firm* — Myers Bigel, P.A.

(57) ABSTRACT

Signal power management circuits and smart cards including the same are provided. For example, a signal power management circuit comprises a rectifier that is configured to rectify a received radio frequency signal and output a first rectified voltage, a first regulator that is configured to maintain the first rectified voltage at a predetermined first voltage level, and a second regulator that is configured to receive an output of the first regulator and maintain a second rectified voltage different from the first rectified voltage at a predetermined second voltage level. A signal detector of the signal power management circuit is configured to receive the first rectified voltage and the second rectified voltage and detect a signal component of the received radio frequency signal on the basis of a difference between the first voltage level of the first rectified voltage and the second voltage level of the second rectified voltage.

20 Claims, 13 Drawing Sheets

(51) Int. Cl.
    *G06K 7/00*     (2006.01)
    *G06Q 20/20*    (2012.01)
    *G06Q 20/32*    (2012.01)
    *H02M 3/158*    (2006.01)
    *H04B 5/00*     (2006.01)
    *H02J 50/80*    (2016.01)

(52) U.S. Cl.
    CPC ............ *H02J 50/80* (2016.02); *H02M 3/158* (2013.01); *H04B 5/0062* (2013.01)

(56) References Cited

U.S. PATENT DOCUMENTS

| | | |
|---|---|---|
| 9,368,975 B2 | 6/2016 | Wheeland et al. |
| 9,634,729 B2 | 4/2017 | Kim et al. |
| 9,825,788 B2 * | 11/2017 | Van De Beek ......... H04L 27/00 |
| 9,853,694 B2 | 12/2017 | Sloutsky et al. |
| 10,090,714 B2 | 10/2018 | Bohn et al. |
| 2012/0086282 A1 | 4/2012 | Lee |
| 2014/0043003 A1 * | 2/2014 | Lee ........................... G05F 1/10 |
| | | 323/283 |
| 2017/0111073 A1 | 4/2017 | Hajimiri et al. |
| 2017/0323166 A1 * | 11/2017 | Colussi ............ G06K 19/07354 |
| 2018/0188787 A1 | 7/2018 | Isaac et al. |
| 2019/0051359 A1 * | 2/2019 | Yoo ........................ G11C 16/10 |
| 2019/0393782 A1 * | 12/2019 | Teplechuk ............ H02M 3/156 |
| 2021/0406630 A1 * | 12/2021 | Lee ........................... G05F 1/46 |

* cited by examiner

SIGNAL POWER MANAGEMENT CIRCUITS AND SMART CARDS INCLUDING THE SAME

CROSS-REFERENCE TO RELATED APPLICATIONS

This application claims priority from Korean Patent Application No. 10-2020-0076883 filed on Jun. 24, 2020, and from Korean Patent Application No. 10-2021-0000924 filed on Jan. 5, 2021 in the Korean Intellectual Property Office, the disclosure of each of which is incorporated herein by reference in its entirety.

BACKGROUND

1. Field

The present disclosure relates to signal power management circuits and to smart cards including the signal power management circuits.

2. Description of the Related Art

Smart cards may be referred to as chip cards, integrated circuit (IC) cards, or the like, and may be classified into contact type cards and non-contact type cards according to methods of use. A contact type card may have a contact terminal on the surface of the card to which an external power is applied, receiving the external power through electrical contact (e.g., direct electrical contact). A non-contact type card may receive a power voltage from a radio frequency signal received through a non-contact type terminal such as an antenna. There are also combination type cards that use both contact and non-contact type power supply methods.

In a non-contact type card system, and in particular in a smart card system, a card reader may recognize a smart card located within a short distance using a radio frequency signal. Card readers and smart cards may use a technique for recognizing information in a non-contact manner to exchange information.

The smart cards may receive power (internal voltage) and signals in methods in which electromagnetic waves are radiated from the card readers. These electromagnetic waves are induced into voltage signals. In order to receive electromagnetic waves provided from the card reader and stabilize a generated voltage, a voltage regulator may be used in a power circuit of the smart card. However, when the voltage regulator is controlled at a high speed in order to process signals at a high speed, current consumption may increase excessively.

SUMMARY

Aspects of the present disclosure provide signal power management circuits capable of operating at a high speed while minimizing power consumption.

Aspects of the present disclosure also provide smart cards capable of operating at a high speed while minimizing power consumption.

The scope of the present disclosure is not limited to the above-described objects, and other objects and aspects not explicitly mentioned herein may be clearly understood by those skilled in the art from the following descriptions.

According to some aspects of the present disclosure, there is provided a signal power management circuit comprising a rectifier configured to rectify a received radio frequency signal and output a first rectified voltage, a first regulator configured to maintain the first rectified voltage at a predetermined first voltage level, and a second regulator configured to receive an output of the first regulator and maintain a second rectified voltage at a predetermined second voltage level, the first rectified voltage differing from the second rectified voltage. The signal power management circuit also comprises a signal detector configured to receive the first rectified voltage and the second rectified voltage and detect a signal component of the received radio frequency signal based on a difference between the first voltage level of the first rectified voltage and the second voltage level of the second rectified voltage.

According to some aspects of the present disclosure, there is provided a signal power management circuit comprising a first transistor having a first terminal configured to receive a first rectified voltage generated from a received radio frequency signal, and a second transistor having a first terminal configured to receive a second rectified voltage. The second rectified voltage is generated based on the first rectified voltage and different from the first rectified voltage. The second transistor is configured to share a gate terminal with the first transistor. The signal power management circuit also comprises a first current mirror circuit configured to perform first mirroring of a first current that flows through the second transistor and to generate a second current, a second current mirror circuit configured to perform second mirroring of the second current and to generate a third current, and a demodulator configured to receive the third current and to restore a signal component of the radio frequency signal.

According to some aspects of the present disclosure, there is provided a smart card comprising a control unit, and a signal power management circuit configured to generate internal power from a radio frequency signal that is received from an external unit, to provide the internal power to the control unit, and to detect a signal component of the received radio frequency signal. The signal power management circuit is configured to generate from the received radio frequency signal a first rectified voltage and a second rectified voltage, which is different from the first rectified voltage, and the signal power management circuit is configured to detect the signal component of the received radio frequency signal based on a difference between a voltage level of the first rectified voltage and a voltage level of the second rectified voltage.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Hereinafter, some embodiments according to the inventive concepts of the present disclosure will be described with reference to the accompanying drawings.

Figure 1:
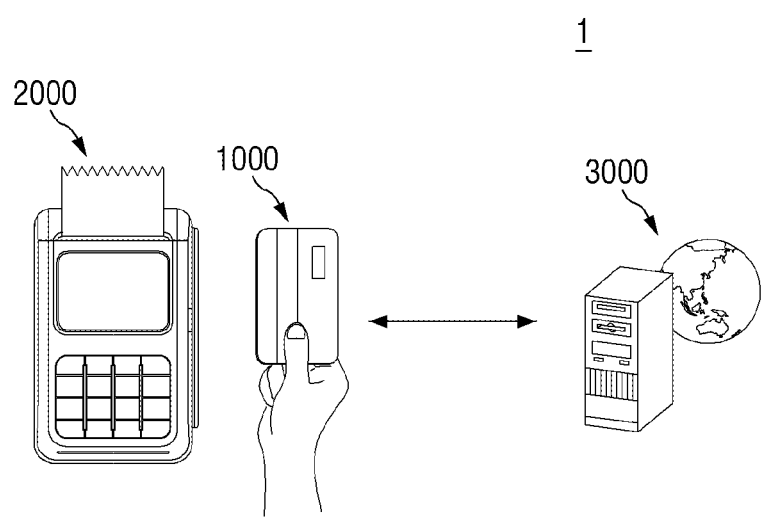
FIG. 1 is a diagram illustrating a smart card payment system according to some embodiments of the inventive concepts.

FIG. 1 is a diagram illustrating a smart card payment system according to some embodiments.

Referring to FIG. 1, a smart card payment system 1 may include a biometric authentication-based smart card 1000, a payment terminal 2000, and a payment server 3000. Hereinafter, the inventive concepts of the present disclosure will be described using an example of a biometric authentication-based smart payment system in which the biometric authentication-based smart card 1000 is used, but the present disclosure and the embodiments thereof are not limited thereto. For example, the inventive concepts of the present disclosure may be modified and implemented as a smart card payment system in which a smart card that does not have a biometric authentication function is used.

The biometric authentication-based smart card 1000 (which hereinafter is referred to as a smart card) may output payment method information corresponding to payment request information when the payment request information is output from the payment terminal 2000 in an online or offline sale store.

The payment terminal 2000 may be a unit for storing deposit information about types, the number, and prices of products sold online/offline and managing sales information for each product. For example, when the smart card payment system 1 is in an offline environment, the payment terminal 2000 may be a point of sale (POS) terminal in a store, and when the smart card payment system 1 is in an online environment, the payment terminal 2000 may be an online shopping mall system.

The payment terminal 2000 may be a unit which is installed in an offline sale store and is capable of reading product information from a barcode attached to each product using a reader or the like. That is, the payment terminal 2000 may include, for example, a card reader. Here, the product information may include information about a product type, a product code, a sales price, and the like, but the present disclosure and the exemplary embodiments are not limited thereto.

The payment terminal 2000 may transfer sales-related information to the payment server 3000. The sales-related information may include at least one of sales price information, an identification (ID) of the payment terminal 2000, a time when the payment terminal 2000 reads sales price information of a product, a type of operation that the payment terminal 2000 intends to process, domain information about a management server of the payment terminal 2000, and deposit account information about an owner of the payment terminal 2000, as examples.

Further, the payment terminal 2000 may transfer to the payment server 3000 payment information that is read from the smart card 1000. The payment information may include, as examples, payment level information and payment method information of a user, which are registered in the smart card 1000.

In some embodiments, the payment method information may include payment account information or payment card information. In some embodiments, the payment account information may be information related to a bank account of the user and may include, as examples, at least one of a bank account number, an account password, and a security-related authentication number. In some embodiments, the payment card information may include, as examples, information about at least one of a credit card company that makes payment, a card number, and a card password.

Further, in some embodiments the payment terminal 2000 may check whether the user read from the smart card 1000 is a registered user on the basis of biometric authentication information read from the smart card 1000. The biometric authentication information may be read from the smart card 1000 as part of the payment information. When the user is a registered user, payment level information corresponding to a user index of the corresponding user may be transferred to the payment server 3000.

The payment server 3000 may determine whether to approve payment on the basis of the sales-related information and/or the payment information received from the payment terminal 2000, and may transfer an approval determination result to the payment terminal 2000.

In some embodiments, based on the payment information, the payment server 3000 may determine whether to approve payment for the amount according to the sales-related information on the basis of the received payment method information and payment level information.

For example, when the payment information is the payment account information, the payment server 3000 may be a payment server of a financial institution (a bank, etc.) in which the user has opened a financial account. For example, when the payment information is the payment card information, the payment server 3000 may be a payment server of a financial institution (a card company) in which the user has opened a payment card.

Here, a normal user is a registered user stored in the payment server 3000 and may refer to a user who has a payment account of which an amount or balance that is greater than or equal to the amount requested for payment, or a user who has a payment card in which the amount requested for payment is within a usable limit range (e.g., a user who has a sufficient balance or sufficient credit limit for the requested payment or financial transaction).

When it is determined that the user is a normal user, the payment server 3000 may check the sales price information and/or the ID of the payment terminal 2000 from the sales-related information, compare the pieces of information to an available payment range of the user obtained from the payment level information, and determine whether to approve the payment.

Figure 2:
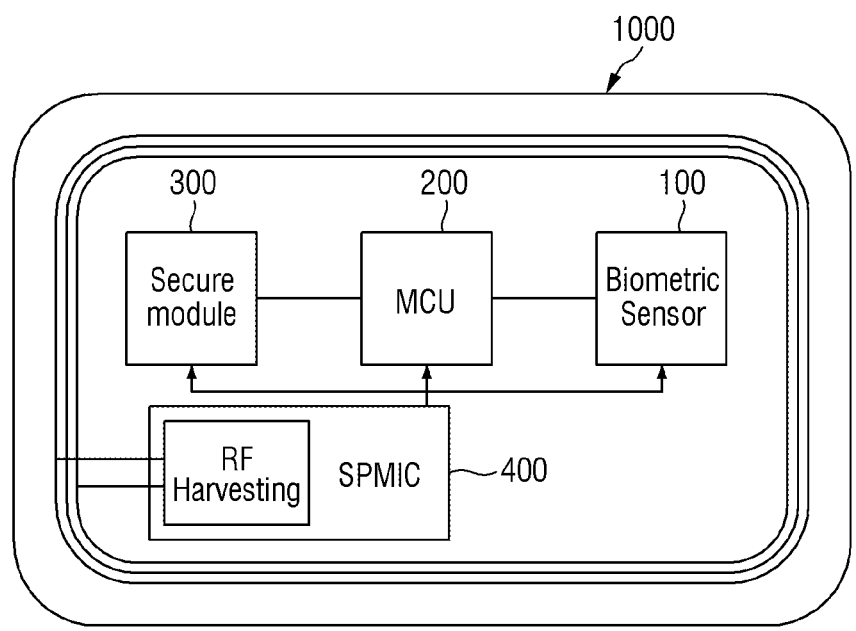
FIG. 2 is a block diagram of a biometric authentication-based smart card of FIG. 1.

FIG. 2 is a block diagram of the biometric authentication-based smart card 1000 of FIG. 1.

Referring to FIG. 2, the smart card 1000 may include a biometric authentication sensor 100, a microcontroller unit (MCU) 200, a security module 300, and a signal power management circuit (SPMIC) 400.

In some embodiments, the biometric authentication sensor 100, the MCU 200, the security module 300, and the signal power management circuit 400 may be implemented as a plurality of chips, as illustrated in FIG. 2, but the present disclosure is not limited thereto. Stated differently, FIG. 2 illustrates a case in which each component is implemented as a separate chip but, as another example and in other embodiments, at least two of the biometric authentication sensor 100, the MCU 200, the security module 300, and the signal power management circuit 400 may be implemented as one chip. As another example, the biometric authentication sensor 100 and the MCU 200 may be implemented as one chip, and the security module 300 and the signal power management circuit 400 may be implemented as separate chips. As yet another example, the security module 300 and the signal power management circuit 400 may be implemented as one chip, and the biometric authentication sensor 100 and the MCU 200 may be implemented as separate chips. As yet another example, the security module 300, the signal power management circuit 400, and the MCU 200 may be implemented as one chip, and the biometric authentication sensor 100 may be implemented as a separate chip. Further, in some embodiments, the biometric authentication sensor 100, the MCU 200, the security module 300, and the signal power management circuit 400 may be implemented as one chip.

The biometric authentication sensor 100 may be a sensor (or sensors) that detects biometric information of the user. Here, the biometric information may be, for example, biometric information, such as fingerprint information, footprint information, iris information, facial information, and blood vessel information, or the like. In some embodiments, the biometric authentication sensor 100 may be or may include a fingerprint sensor. When the biometric authentication sensor 100 is or includes a fingerprint sensor, the fingerprint sensor may be at least one of an optical fingerprint sensor, a piezoelectric fingerprint sensor, a capacitive fingerprint sensor, an ultrasonic fingerprint sensor, and a thermal fingerprint sensor, as examples.

The biometric authentication sensor 100 may detect the biometric information of the user, obtain the biometric information as a raw image or raw signal, and transfer the raw image or raw signal to the MCU 200.

The MCU 200 may receive the raw image or raw signal from the biometric authentication sensor 100, and extract data from the raw signal or raw image. For example, the MCU 200 may extract feature point information from the raw image. The MCU 200 may output the extracted data in one or more forms, such as a matching template including the extracted feature point information, as one example.

In some embodiments, when the biometric information is the fingerprint information, the MCU 200 may use a preset feature point extraction algorithm to extract the feature point information on the basis of geometric features of a fingerprint, such as bifurcations, ridge ends, and shapes of valleys or ridges, and output a matching template. The feature point extraction algorithm may be at least one algorithm of various known algorithms.

In some embodiments, the MCU 200 may further perform anti-spoofing to check whether the biometric information is fake information by modifying the raw signal or raw image, such as performing filtering on the raw signal or raw image or the like.

In some embodiments, the MCU 200 may control the overall operation of the biometric authentication sensor 100.

The security module 300 may process and store security information requiring security. In some embodiments, the security module 300 may store first security information for information related to an application and/or information related to a financial payment service, and second security information related to an embedded ID service.

In some embodiments, the first security information may include information about a service related to an application. For example, the first security information may include information requiring security, such as user authentication information. The user authentication information may be biometric information and may include, for example, information for identifying the user, such as iris information, fingerprint information, blood vessel information, facial information, or the like.

In some embodiments, the second security information may include information related to a financial service (e.g., a payment service).

In some embodiments, the security module 300 may be implemented in hardware. The security module 300 may be implemented as one chip that integrally supports two or more protocols, although the present disclosure is not limited thereto and the security module 300 may be implemented as a plurality of chips. The security module 300 may support communication protocols and/or non-communication protocols.

The signal power management circuit 400 may generate internal power from a radio frequency (RF) signal received from an external unit (not illustrated in FIG. 2), and may provide the generated internal power to a control unit such as the MCU 200 or the like, the biometric authentication sensor 100, and/or the security module 300. The signal power management circuit 400 may detect a signal component of the received RF signal, and may provide the detected signal component to the control unit such as the MCU 200 or the like, the biometric authentication sensor 100, and/or the security module 300.

Hereinafter, aspects of the signal power management circuit 400 according to some embodiments will be described in more detail with reference to FIGS. 3 to 6.

Figure 3:
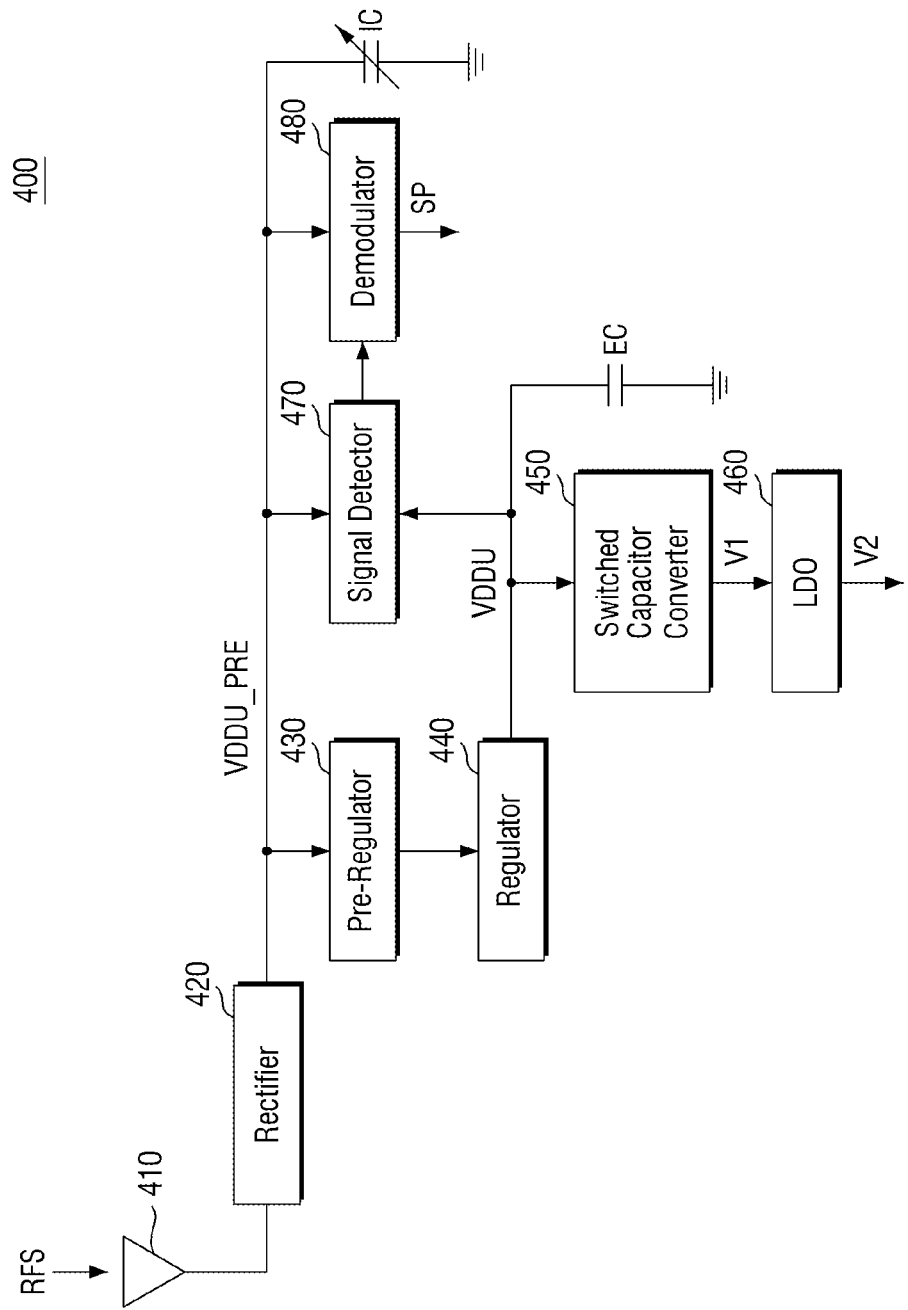
FIG. 3 is a block diagram of a signal power management circuit of FIG. 2.
Figure 4:
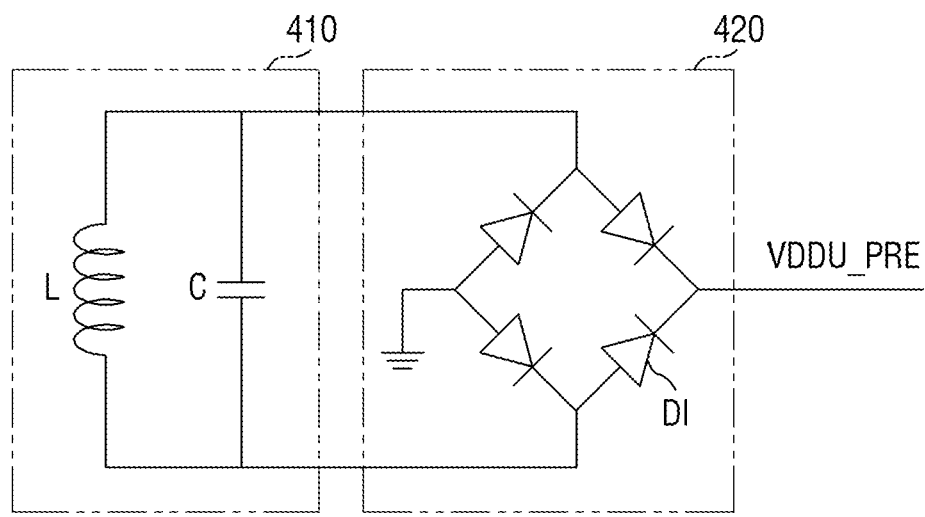
FIG. 4 is an exemplary detailed circuit diagram illustrating an antenna and a rectifier of FIG. 3.
Figure 5:
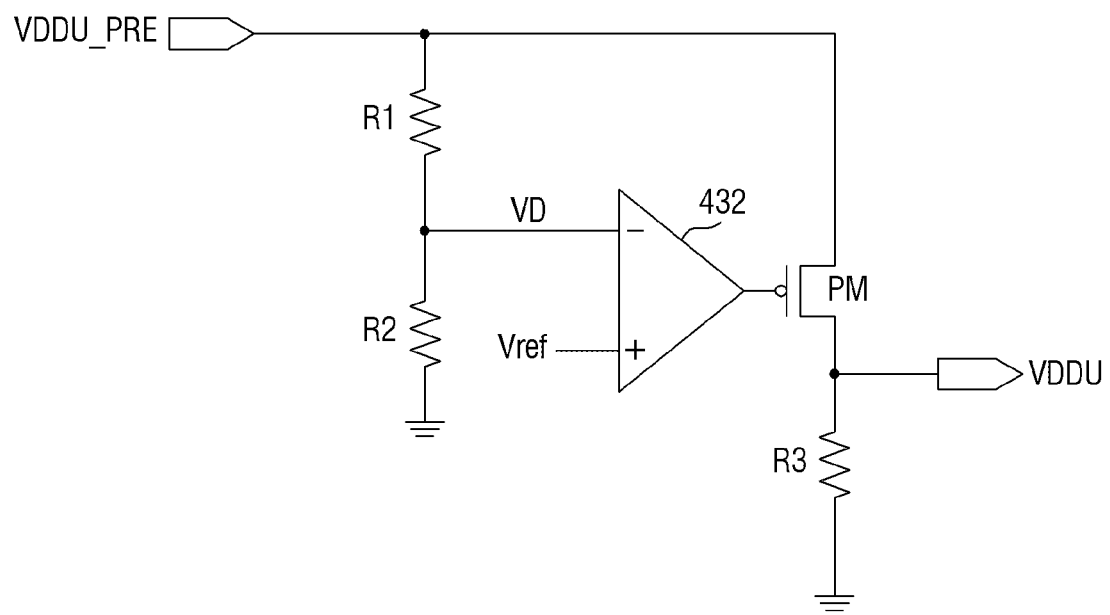
FIG. 5 is an exemplary detailed circuit diagram illustrating a regulator of FIG. 3.
Figure 6:
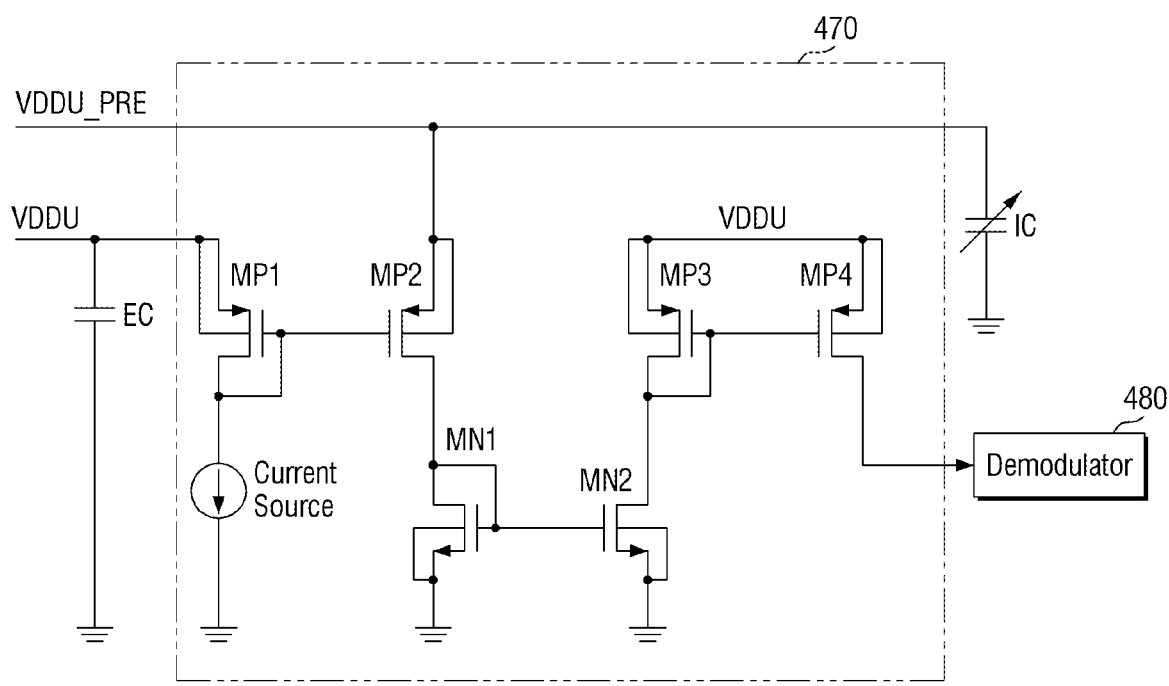
FIG. 6 is an exemplary detailed circuit diagram illustrating a signal detector of FIG. 3.

FIG. 3 is a block diagram of the signal power management circuit of FIG. 2. FIG. 4 is an exemplary detailed circuit diagram illustrating an antenna and a rectifier of FIG. 3. FIG. 5 is an exemplary detailed circuit diagram illustrating a regulator of FIG. 3. FIG. 6 is an exemplary detailed circuit diagram illustrating a signal detector of FIG. 3.

Referring to FIG. 3, the signal power management circuit 400 may include an antenna 410, a rectifier 420, a pre-regulator 430, a regulator 440, a switched capacitor converter 450, a low-dropout (LDO) regulator 460, a signal detector 470, and a demodulator 480.

The antenna 410 may receive an RF signal RFS from an external unit (not illustrated in FIG. 3) and/or transmit an RF signal RFS to an external unit. For example, the antenna 410 may transmit and/or receive RF signals RFS in order to communicate with a card reader. When the antenna 410 transmits the RF signal RFS, the antenna 410 may receive a signal from a modulator (not illustrated) and transmit the RF signal RFS to the external unit.

Referring to FIGS. 3 and 4, in some embodiments, the antenna 410 may be modeled as a structure in which an inductor L and a capacitor C are connected in parallel. The antenna 410 may convert the RF signal RFS transmitted from the card reader into an electrical signal in an electromagnetic induction method using the inductor L and the capacitor C.

In some embodiments, the antenna 410 may be formed in a loop antenna structure to communicate with an external card reader. For example, the antenna 410 may be formed in a double resonance loop structure for high electromagnetic efficiency.

The rectifier 420 may rectify an alternating current (AC) signal received through the antenna 410 to output a first rectified voltage VDDU_PRE. For example, the rectifier 420 may include rectifier circuits of a half- or full-wave rectification method. Further, the rectifier 420 may include a smoothing circuit for smoothing the rectified voltage. In some embodiments, in order to configure the rectifier 420 of the full-wave rectification method, four diodes DI that are bridge-coupled as illustrated in FIG. 4 may be used. However, the rectification method of the rectifier 420 is not limited thereto, and the present disclosure is not limited to the explicitly provided rectification method and rectifier 420, and the configuration of the rectifier 420 may be modified and implemented.

The AC signal input to both terminals of the rectifier 420 may be output as the first rectified voltage VDDU_PRE, which may be full-wave rectified.

Referring to FIGS. 3 and 5, the pre-regulator 430 may detect a level change of the first rectified voltage VDDU_PRE and perform a regulating operation of constantly maintaining the first rectified voltage VDDU_PRE at a predetermined first level.

The pre-regulator 430 may include resistors R1, R2, and R3, a comparator 432, and a power transistor PM. Although an example of a configuration of the pre-regulator 430 is illustrated in FIG. 5, the present disclosure and the inventive concepts thereof are not limited thereto.

The resistor R1 and the resistor R2 may be used to divide the first rectified voltage VDDU_PRE, resulting in a divided voltage VD.

The divided voltage VD resulting from the first rectified voltage VDDU_PRE divided by the resistor R1 and the resistor R2 may be provided to a first input terminal (−) of the comparator 432, and a reference voltage Vref may be provided to a second input terminal (+). The reference voltage Vref may determine the above-described first level of the pre-regulator 430.

The resistor R3 may be used to generate a second rectified voltage VDDU using a regulating current, described more fully herein.

Referring to FIG. 3, the regulator 440 may receive an output of the pre-regulator 430 and perform a regulating operation of maintaining the second rectified voltage VDDU at a predetermined second voltage level.

In some embodiments, the regulator 440 may have a configuration similar to that of the pre-regulator 430 described above, but the present disclosure and the inventive concepts thereof are not limited thereto.

In some embodiments, the second voltage level of the regulator 440 may be different from a first voltage level of the pre-regulator 430. Specifically, the second voltage level of the regulator 440 may be lower than the first voltage level of the pre-regulator 430. Accordingly, a voltage level of the second rectified voltage VDDU may be lower than a voltage level of the first rectified voltage VDDU_PRE. More specifically, a voltage level of a direct current (DC) of the second rectified voltage VDDU may be lower than a voltage level of the first rectified voltage VDDU_PRE.

The switched capacitor converter 450 may convert the voltage level of the second rectified voltage VDDU to generate a first voltage V1. The first voltage V1 may have a voltage level that is lower than a voltage level of the second rectified voltage VDDU. In some embodiments, the switched capacitor converter 450 may generate the first voltage V1 through a high-speed switching operation.

When a switching operation of the switched capacitor converter 450 involves a high-speed switching operation, noise may be generated. The pre-regulator 430 may be configured to block such noise to prevent the noise from being transmitted as an erroneous signal to the external unit (e.g., a card reader) through the rectifier 420.

The LDO regulator 460 may receive the first voltage V1 from the switched capacitor converter 450 and may convert the voltage level of the first voltage V1 to generate a second voltage V2. The second voltage V2 may be provided as internal power to the biometric authentication sensor 100, the MCU 200, the security module 300, and the like of FIG. 1 described above. A voltage level of the second voltage V2 may be lower than the voltage level of the first voltage V1, but the present disclosure and the inventive concepts thereof are not limited thereto.

An internal capacitor IC may be used to maintain the first rectified voltage VDDU_PRE, and an external capacitor EC may be used to maintain the second rectified voltage VDDU.

Referring to FIGS. 3 and 6, the signal detector 470 may receive the first rectified voltage VDDU_PRE and the second rectified voltage VDDU and may detect a signal component of the RF signal RFS on the basis of a difference between the voltage level of the first rectified voltage VDDU_PRE and the voltage level of the second rectified voltage VDDU. More specifically, the signal detector 480 may detect a signal component of the RF signal RFS on the basis of a difference between the voltage level of the DC component of the first rectified voltage VDDU_PRE and the voltage level of the DC component of the second rectified voltage VDDU.

In some embodiments, the signal detector 470 may include a plurality of transistors MP1, MP2, MP3, MP4, MN1, and MN2. However, embodiments of circuits implementing the signal detector 470 are not limited thereto, nor are the present disclosure and the inventive concepts thereof.

The second rectified voltage VDDU may be applied to a source terminal of the transistor MP1. In addition, the first rectified voltage VDDU_PRE may be applied to a source terminal of the transistor MP2. The transistor MP1 and the transistor MP2 may share a gate terminal.

The transistor MN1 may be connected to the transistor MP2. In addition, the transistor MN2 and the transistor MN1 may share a gate terminal. The transistor MP3 may be connected to the transistor MN2. In addition, the transistor MP4 and the transistor MP3 may share a gate terminal. The second rectified voltage VDDU may be applied to source terminals of the transistor MP3 and the transistor MP4.

The transistor MN1 and the transistor MN2 may serve as a first current mirror circuit for mirroring a current flowing through the transistor MP2. Further, the transistor MP3 and the transistor MP4 may serve as a second current mirror circuit for mirroring a current flowing through the first current mirror circuit.

In some embodiments, the types of the transistors MP1, MP2, MP3, and MP4 may be different from the types of the transistors MN1 and MN2. Specifically, for example, the transistors MP1, MP2, MP3, and MP4 may include p-channel metal-oxide-semiconductor (PMOS) transistors and the transistors MN1 and MN2 may include n-channel metal-oxide-semiconductor (NMOS) transistors, but the present disclosure and the inventive concepts thereof are not limited thereto.

In some embodiments, the transistor MP1 and the transistor MP2 may be similar transistors. Herein, reference to two transistors as similar transistors may mean that the sizes and threshold voltages thereof are substantially the same. Further, referring to the sizes and threshold voltages of the two transistors MP1 and MP2 as substantially the same is intended to indicate that the two transistors MP1 and MP2 are designed with the same parameters at the time of design, and conceptually accounts for any slight observable differences in the produced transistors according to process variations. In other words, the two transistors MP1 and MP2 are similar transistors because they are regarded as such due to their designs, and slight differences between them as manufactured may be ignored.

The demodulator 480 may receive a current from the signal detector 470 and may restore the signal component of the received RF signal RFS. The demodulator 480 may provide the restored signal component SP in the form of an input signal to the biometric authentication sensor 100, the MCU 200, the security module 300, and the like of FIG. 1 described above.

Hereinafter, an operation of the signal power management circuit 400 according to some embodiments will be described with reference to FIGS. 3, 7, and 8.

Figure 7:
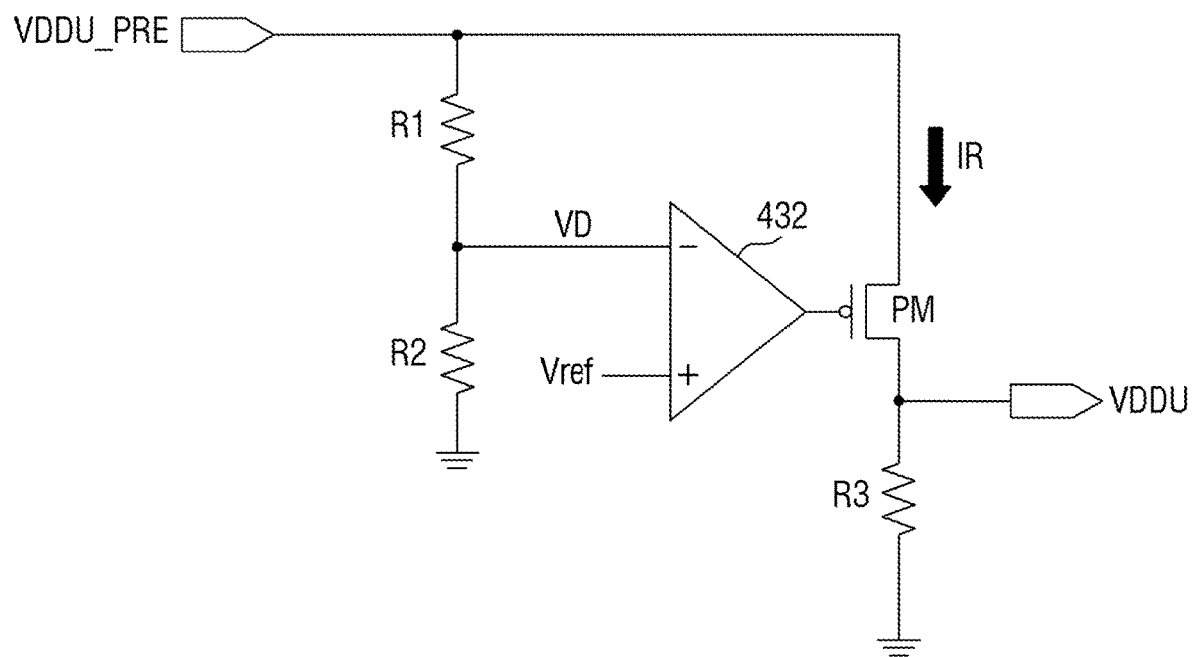
FIG. 7 is a diagram for describing the operation of the regulator of FIG. 3.

FIG. 7 is a diagram for describing the operation of the regulator of FIG. 3. FIG. 8 is a diagram for describing the operation of the signal detector of FIG. 3.

First, referring to FIGS. 3 and 7, when the antenna 410 receives the RF signal RFS from the external unit (e.g., a card reader), the rectifier 420 rectifies the AC signal received through the antenna 410 to output a first rectified voltage VDDU_PRE.

The resistors R1 and R2 of the pre-regulator 430 transfer the divided voltage VD obtained by dividing the first rectified voltage VDDU_PRE to the first input terminal (−) of the comparator 432. That is, the first rectified voltage VDDU_PRE having a relatively high voltage level may be converted into a divided voltage VD having a relatively low voltage level using the resistors R1 and R2. The converted divided voltage VD may be applied to the first input terminal (−) of the comparator 432. Accordingly, a level change of the first rectified voltage VDDU_PRE is input to the first input terminal (−) of the comparator 432.

When the voltage level of the divided voltage VD input to the first input terminal (−) is lower than the reference voltage Vref, the comparator 432 may generate an output voltage having a high level (e.g., a logic high level, H), which may turn the power transistor PM off. Then, a magnitude of a regulating current IR flowing to the ground through the power transistor PM is reduced, and the voltage level of the first rectified voltage VDDU_PRE may be increased.

Conversely, when the voltage level of the divided voltage VD input to the first input terminal (−) is higher than the reference voltage Vref, the comparator 432 generates an output voltage having a low level (e.g., a logic low level, L), which may turn the power transistor PM on. Then, the magnitude of the regulating current IR flowing to the ground through the power transistor PM is increased, and the voltage level of the first rectified voltage VDDU_PRE is reduced. The pre-regulator 430 may thus maintain the voltage level of the first rectified voltage VDDU_PRE at a relatively constant level through such operation. The voltage level of the first rectified voltage VDDU_PRE controlled by the pre-regulator 430 may be defined by the reference voltage Vref.

The second rectified voltage VDDU output from the pre-regulator 430 may be provided to the regulator 440, and the regulator 440 may maintain the voltage level of the second rectified voltage VDDU through a similar operation as the operation of the pre-regulator 430 described above.

Figure 8:
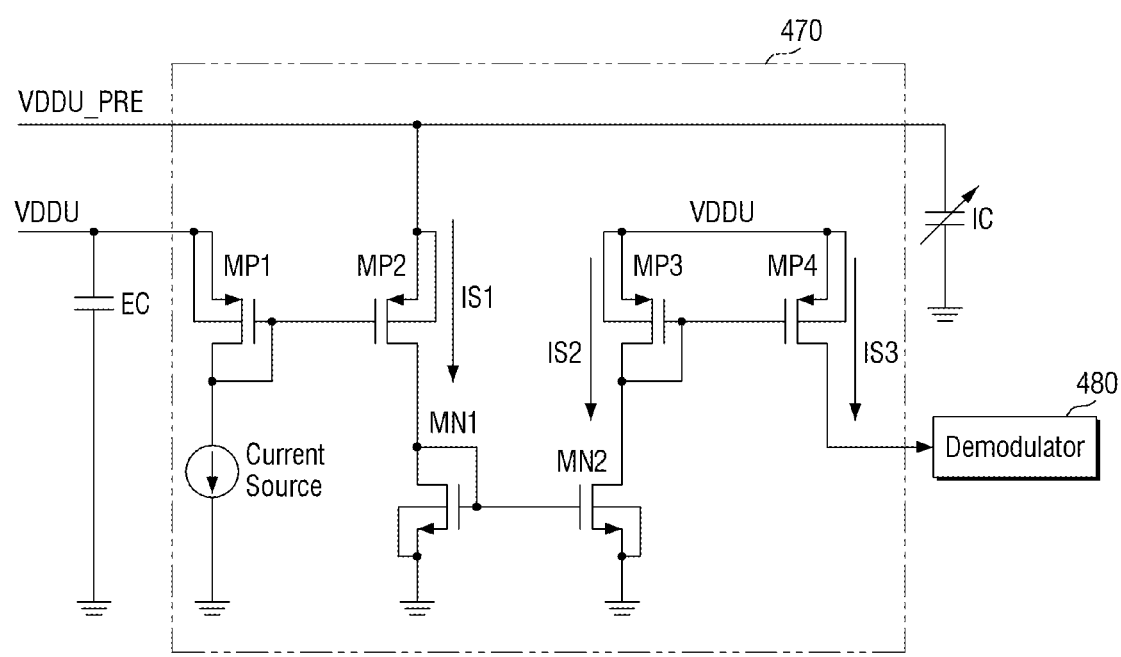
FIG. 8 is a diagram for describing the operation of the signal detector of FIG. 3.

Next, referring to FIGS. 3 and 8, the first rectified voltage VDDU_PRE and the second rectified voltage VDDU may be provided to the signal detector 470.

A current flowing through the transistor MP1 may be determined by a gate voltage VGMP1 of the transistor MP1. The gate voltage VGMP1 of the transistor MP1 may be determined as in Equation 1, below.

$$VGMP1 = VDDU - VTHMP1 \quad (1)$$

In Equation 1, VTHMP1 may denote a threshold voltage of the transistor MP1. Meanwhile, a voltage VSGMP2 between a source terminal and a gate terminal of the transistor MP2 may be determined as in Equation 2, below.

$$VSGMP2 = VDDU\_PRE - VGMP1 = VDDU\_PRE - (VDDU - VTHMP1) \quad (2)$$

Since a current IS1 flowing through the transistor MP2 may be determined by the voltage VSGMP2 between the source terminal and the gate terminal of the transistor MP2 and by the threshold voltage VTHMP2 of the transistor MP2, the current IS1 flowing through the transistor MP2 may be determined as in Equation 3, below.

$$IS1 \propto VSGMP2 - VTHMP2 = VDDU\_PRE - (VDDU - VTHMP1) - VTHMP2 \quad (3)$$

As described above, in some embodiments, since the threshold voltage VTHMP1 of the transistor MP1 may be substantially the same as the threshold voltage VTHMP2 of the transistor MP2, the current IS1 may be determined by the difference between the voltage level of the first rectified voltage VDDU_PRE and the voltage level of the second rectified voltage VDDU. More specifically, the current IS1 may be determined by the difference between the voltage level of the DC component of the first rectified voltage VDDU_PRE and the voltage level of the DC component of the second rectified voltage VDDU.

In addition, the current IS1 may be mirrored as a current IS2 and a current IS3 and provided to the demodulator 480 through a current mirror circuit. That is, the signal component of the RF signal RFS may be provided to the demodulator 480 in the form of the current IS3.

As described above, the signal power management circuit 400 according to some embodiments may provide the signal component of the RF signal RFS to the demodulator 480 using the difference between the voltage level of the DC component of the first rectified voltage VDDU_PRE and the voltage level of the DC component of the second rectified voltage VDDU.

In a smart card with a finger authentication function, rectified voltages having different DC levels may be generated and used due to a power architecture structure. According to some embodiments, the signal component may be provided to the demodulator 480 without being affected (or by being less affected) by variables other than the difference between the voltage level of the DC component of the first rectified voltage VDDU_PRE and the voltage level of the DC component of the second rectified voltage VDDU. Therefore, the reliability of signal transmission may be improved.

Furthermore, in the smart card according to some embodiments, compared to the configuration in which the current flowing through the power transistor of the pre-regulator is mirrored and the signal component of the RF signal RFS is provided to the demodulator 480, a high-speed operation or higher-speed operation may be possible while minimizing power consumption.

For example, when the current flowing through the power transistor of the pre-regulator is mirrored and the signal component of the RF signal RFS is provided to the demodulator 480, a loop delay of the regulator may be added so that some delay is generated when the RF signal is restored. In order to minimize such delay, the regulator should have a high rectification speed. Accordingly, current consumption may be increased for a high-speed operation. However, according to the inventive concepts of the present disclosure, since there may be no loop delay in signal transmission, the regulator does not need to have a high rectification speed. Accordingly, a high-speed operation is possible while minimizing power consumption.

Figure 9:
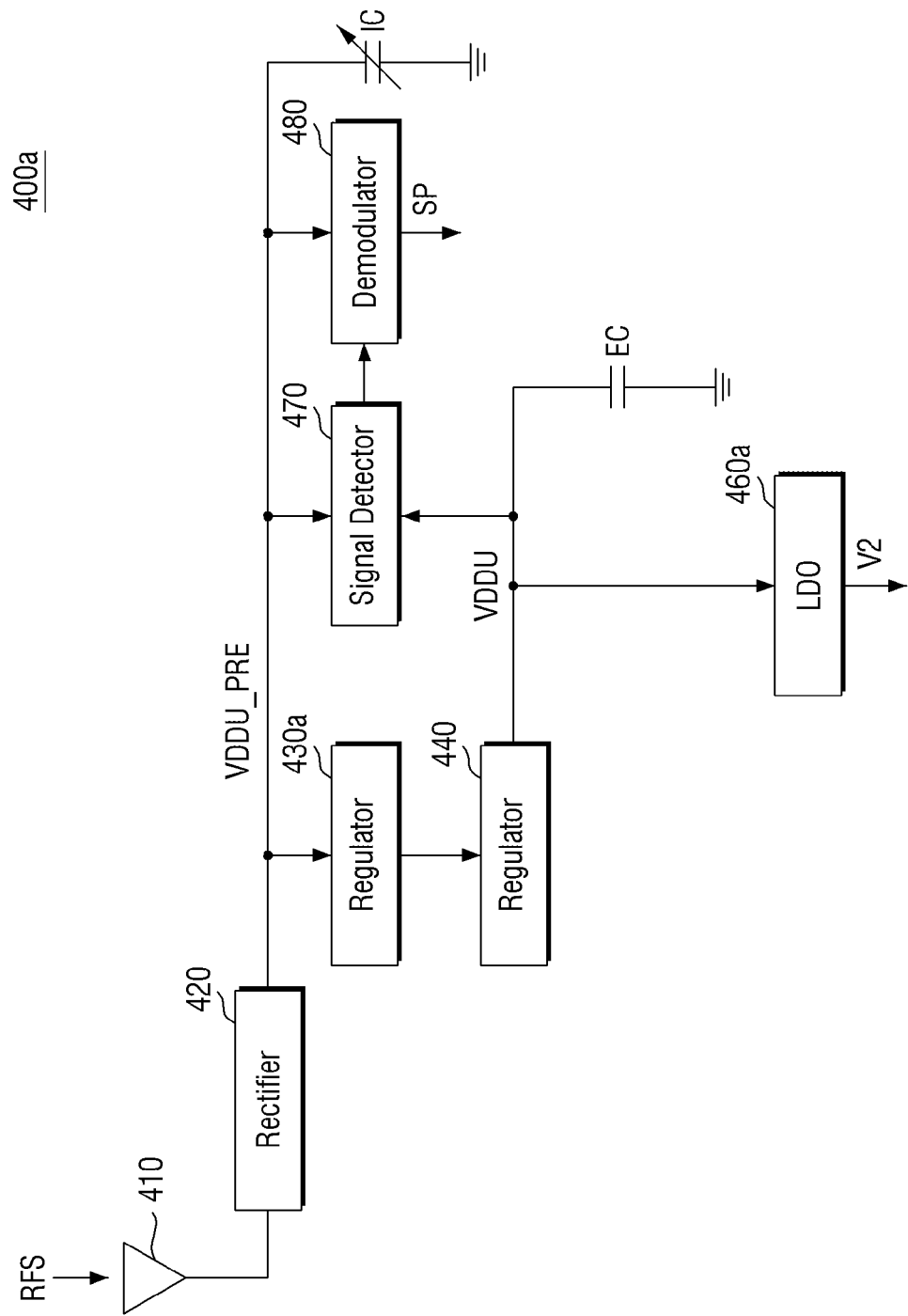
FIG. 9 is a block diagram of a signal power management circuit according to some embodiments of the inventive concepts.

FIG. 9 is a block diagram of a signal power management circuit according to some embodiments.

Hereinafter, in the interest of brevity, differences from the exemplary embodiments discussed above will be mainly described.

Referring to FIG. 9, a signal power management circuit 400a according to some embodiments might not include a switched capacitor converter 450 (see FIG. 3). Accordingly, an LDO regulator 460a may convert a voltage level of a second rectified voltage VDDU to generate a second voltage V2. The second voltage V2 may be provided as internal power to the biometric authentication sensor 100, the MCU 200, the security module 300, and the like of FIG. 1 described above.

Since a switched capacitor converter 450 (see FIG. 3) that operates at a high speed may be omitted, a regulator 430a may be employed instead of the pre-regulator 430 (see FIG. 3).

Figure 10:
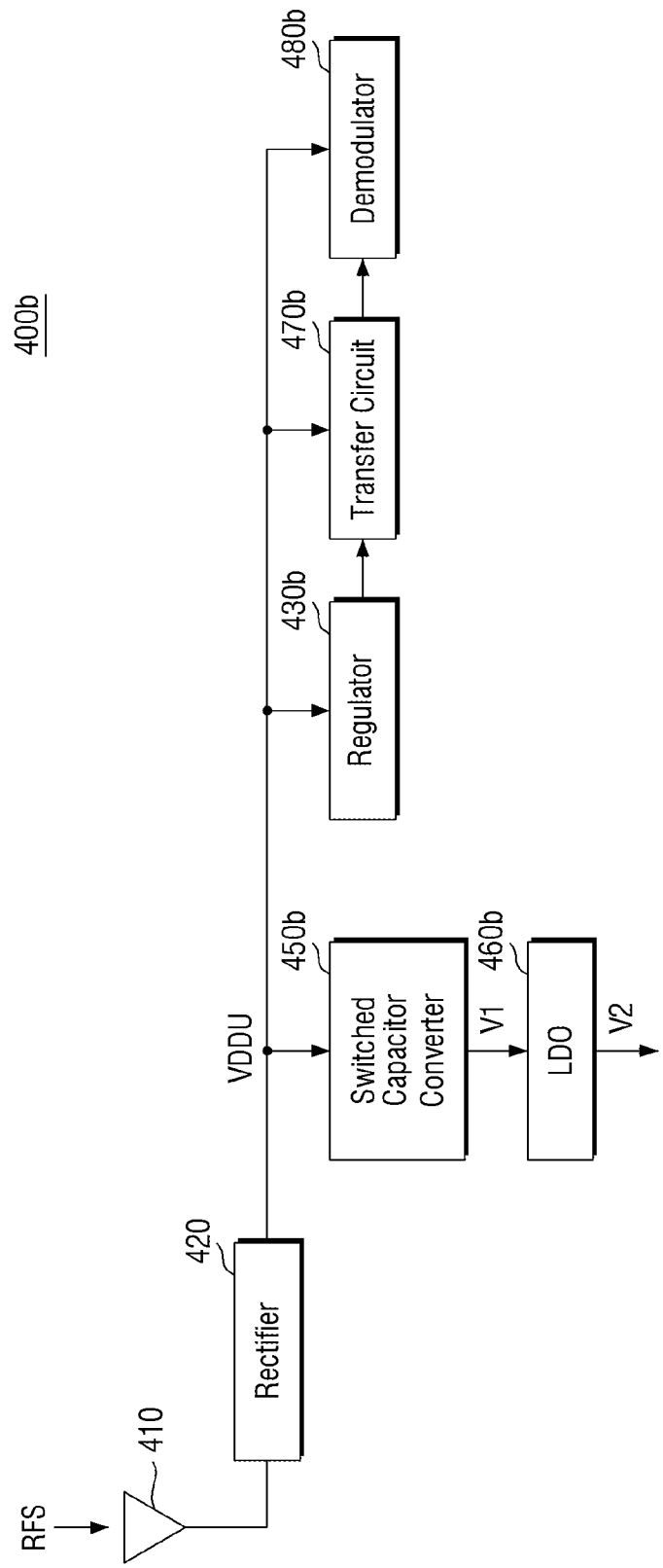
FIG. 10 is a block diagram of a signal power management circuit according to some embodiments of the inventive concepts.

FIG. 10 is a block diagram of a signal power management circuit according to some embodiments.

Hereinafter, in the interest of brevity, differences from the exemplary embodiments discussed above will be mainly described.

Referring to FIG. 10, in a signal power management circuit 400b according to some embodiments, a regulator 430b may perform a regulating operation of maintaining a second rectified voltage VDDU at a predetermined second voltage level.

A switched capacitor converter 450b may convert a voltage level of the second rectified voltage VDDU to generate a first voltage V1, and an LDO regulator 460b may receive a first voltage V1 from the switched capacitor converter 450b and convert a voltage level of the first voltage V1 to generate a second voltage V2.

A transmission circuit 470b may receive outputs of the second rectified voltage VDDU and the regulator 430b, and may provide a signal component of an RF signal RFS to a demodulator 480b. In some embodiments, the transmission circuit 470b may be implemented in a configuration similar to that of the signal detector 470 (see FIG. 3) described above, but the present disclosure and the inventive concepts thereof are not limited thereto.

Figure 11:
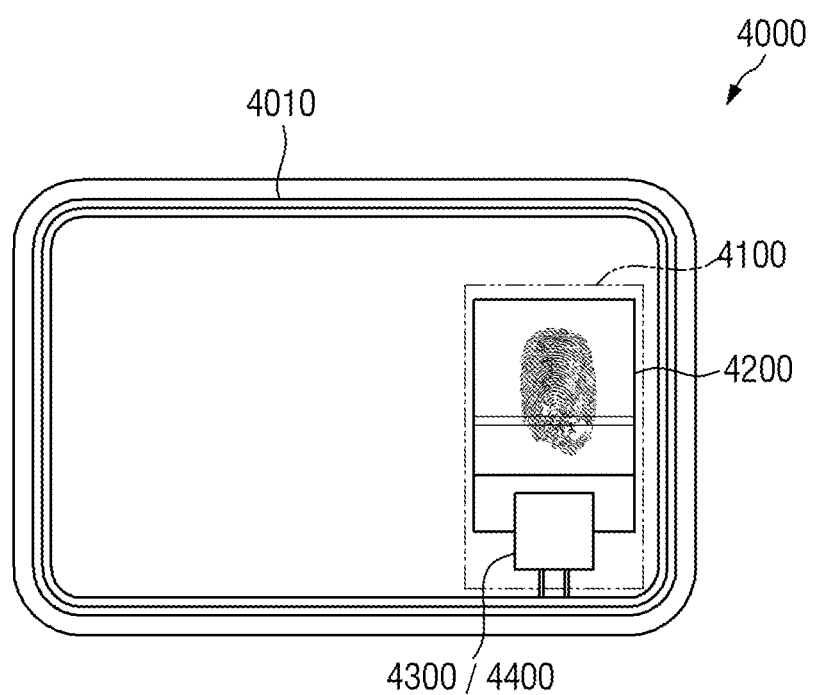
FIG. 11 is a diagram illustrating a biometric authentication-based smart card according to some embodiments of the inventive concepts.
Figure 12:
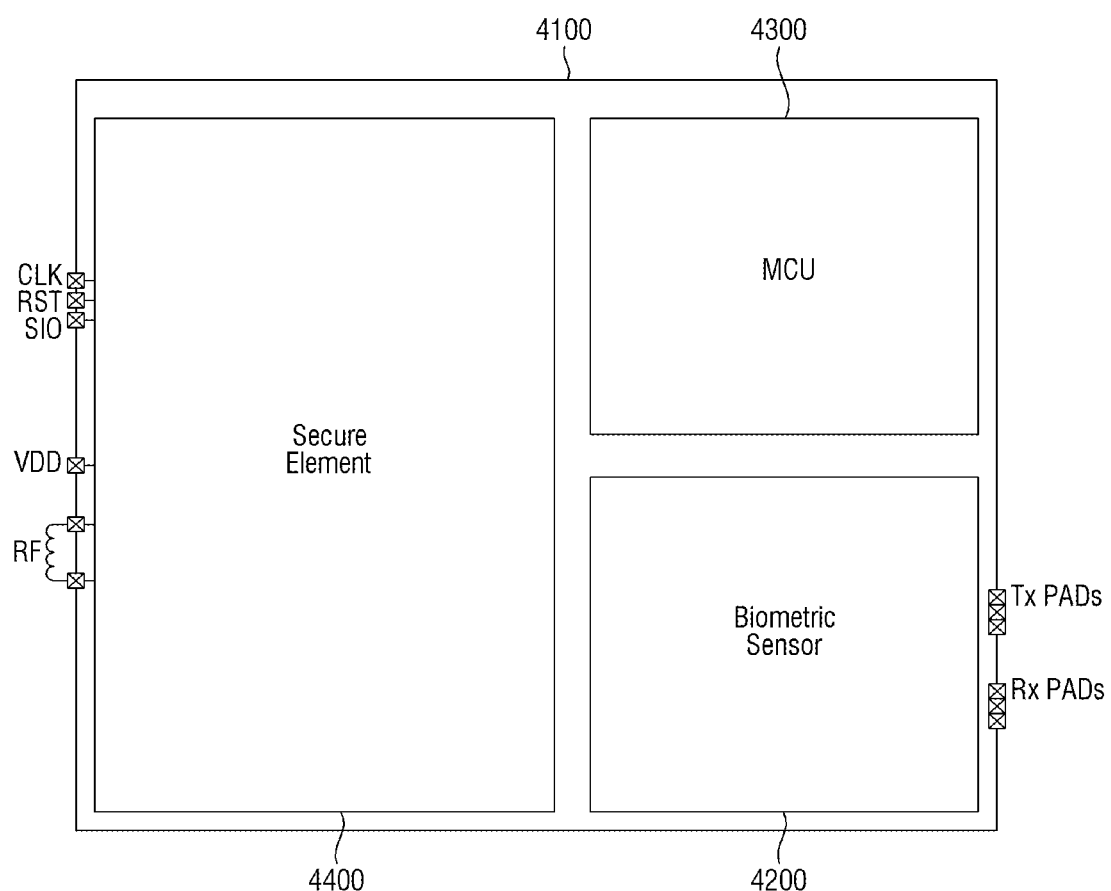
FIG. 12 is a diagram illustrating a biometric authentication integrated chip applied to the smart card of FIG. 11.

FIG. 11 is a diagram illustrating a biometric authentication-based smart card according to some embodiments. FIG. 12 is a diagram illustrating a biometric authentication integrated chip applied to the smart card of FIG. 11.

Referring to FIGS. 11 and 12, a biometric authentication-based smart card 4000 may include an antenna 4010 and an integrated chip 4100. The integrated chip 4100 may include a biometric module 4200, an authentication processing module 4300, and a security module 4400 implemented in a single chip.

The biometric module 4200 may be a unit for reinforcing the security of the smart card 4000. The biometric module 4200 may determine whether fingerprint information or other biometric information of a real owner (i.e., a person registered in advance) of the smart card 4000 matches fingerprint information or other biometric information of the card user. When it is determined that the fingerprints match or other biometric information matches, by authenticating that the user is the real owner of the card, the lock of the security module 4400 embedded in the smart card 4000 may be released for a predetermined period of time. The biometric module 4200 may automatically turn off the lock after the predetermined period of time to prevent illegal use or unauthorized use of the smart card 4000.

The security module 4400 may be an integrated circuit in which card ID information of the smart card 4000 is recorded and stored. The security module 4400 may transfer the recorded card ID information to a payment terminal using a contact or non-contact manner so that electronic payment may be performed.

The security module 4400 may temporarily record the card ID information and may modify or delete the recorded card ID information. The security module 4400 records card ID information for one piece of payment method information among a plurality of pieces of payment method information. Here, the card ID information may be information corresponding to the payment method information and may include pieces of information used in facilitating an electronic payment, such as card number information, card validity period information, card security information, and the like.

In some embodiments, in order to meet security requirement specifications, internal components in the security module 4400 and/or data processed by the security module 4400 may be encrypted based on a random key. For example, the security module 4400 may encrypt and store the fingerprint or biometric information of the real card owner (a person registered in advance) and prevent external exposure of the fingerprint or biometric information.

Thereafter, when verification of the fingerprint or biometric information extracted by the biometric module 4200 is performed due to the use of the smart card 4000, the security module 4400 may receive the registered fingerprint or biometric information from the authentication processing module 4300 and determine whether to approve the use of the smart card 4000 according to a matching result.

The authentication processing module 4300 may generate a fingerprint template or other biometric template by processing a raw image or raw data of the fingerprint received from the biometric module 4200. The raw image or raw data may include minutiae, such as feature points of the fingerprint, that is, detailed feature points such as ridge ends or bifurcations found in the image of the fingerprint. In one example, the authentication processing module 4300 may obtain template information of the corresponding fingerprint image, that is, fingerprint information for verification, by detecting the minutiae.

A peripheral circuit of the biometric module 4200, the authentication processing module 4300, and the security module 4400 may be implemented as one integrated chip.

Figure 13:
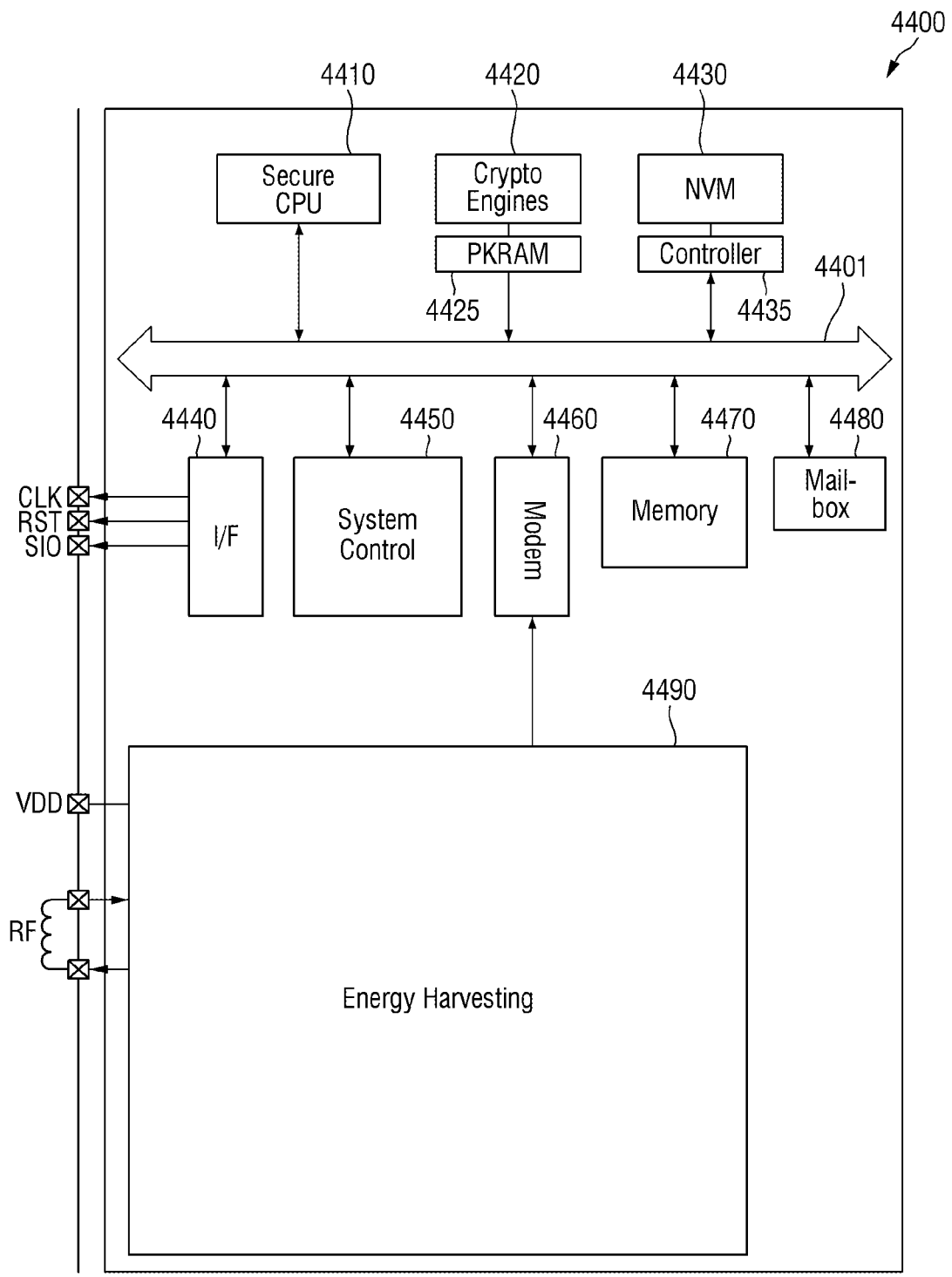
FIG. 13 is a block diagram of a security module of FIG. 12.

FIG. 13 is a block diagram of the security module 4400 of FIG. 12.

Referring to FIG. 13, the security module 4400 may include a security CPU 4410, a crypto engine 4420, a Preserved-over-Kexec random-access memory (PKRAM) 4425, a non-volatile memory 4430, a memory controller 4435, an external interface 4440, a system controller 4450, a modem 4460, a memory 4470, a mailbox 4480, and an energy harvesting unit 4490.

The components 4410 to 4490 may communicate with each other through a bus 4401. For example, the bus 4401 may be provided as an advanced high-performance bus (AHB) interface.

The security CPU 4410 may control the overall operation related to the security of the security module 4400. For example, the security CPU 4410 may match registered fingerprint or other biometric information with fingerprint or other biometric information for verification and determine whether to approve the use of a card in response to a payment request according to a result of the matching.

The crypto engine 4420 may encrypt or decrypt data which will be transferred or received to or from devices outside the security module 4400 (which are not illustrated in FIG. 13). For example, the crypto engine 4420 may perform a private key encryption and/or decryption operation on the basis of Advanced Encryption Standard (AES), Data Encryption Standard (DES), Secure Hash Algorithms (SHA), or the like. The crypto engine 4420 may include a big number multiplier (e.g., Tornado) necessary for an operation such as error detection of encrypted or decrypted data, for example, Rivest-Shamir-Adleman (RSA)/elliptic curve cryptography (ECC).

The PKRAM 4425 is a memory connected to the crypto engine 4420 and may store a public key, and the crypto engine 4420 may encrypt and/or decrypt the data using the public key and the private key.

The non-volatile memory 4430 may be driven by the memory controller 4435. The non-volatile memory 4430 may store code for the security CPU 4410 to operate, initial data, fingerprint information or other biometric information of a registered real user, and the like. Data which is read from the non-volatile memory 4430 and output may further include an error correction code (ECC) bit corresponding to the stored data. The memory controller 4435 may check an ECC bit of read data to detect an error and correct the detected error.

The external interface 4440 may receive a command from a host device (e.g., the payment terminal) or transfer data obtained by processing the command to the host device. The external interface 4440 may include a plurality of pins, for example, a clock signal pin CLK, a reset signal pin RST, and a data pin SIO. The external interface 4440 may be connected with the host device according to the ISO/IEC 7816 standard (or other standard) to communicate with the host device.

The modem 4460 may receive a command from the host device (e.g., the payment terminal) or transfer data obtained by processing the command to the host device. Unlike the external interface 4440, the modem 4460 may communicate with the host device in a non-contact manner according to the ISO/IEC 14443 standard (or other standard).

In some embodiments, the modem 4460 may include the demodulator 480 (see FIG. 3) described above.

The modem 4460 may be connected to the energy harvesting unit 4490. The energy harvesting unit 4490 may be connected to an RF pin connected to the antenna 4010 (see FIG. 11). The energy harvesting unit 4490 may receive an RF signal through the antenna 4010 and generate power on the basis of the received RF signal. The modem 4460 may supply the generated power to the security module 4400 to drive the smart card 4000. That is, in some embodiments, the components described above with reference to FIG. 3 may be implemented in the energy harvesting unit 4490. Alternatively, the components described above with reference to FIG. 3 may be implemented in the energy harvesting unit 4490 and/or the modem 4460.

The system controller 4450 may perform system control operations, such as clock control, drive reset control, and power supply control of the smart card 4000.

The memory 4470 may be a working memory that stores data generated during the operation of the security module 4400. For example, the memory 4470 may be a volatile memory such as a random access memory (RAM). The mailbox 4480 may communicate with the authentication processing module 4300 (see FIG. 12).

In concluding the detailed description, those skilled in the art will appreciate that many variations and modifications may be made to the described embodiments without substantially departing from the principles and inventive concepts of the present disclosure. Therefore, the disclosed preferred embodiments of the disclosure are used in a generic and descriptive sense only and not for purposes of limitation.

What is claimed is:

1. A signal power management circuit comprising:
    a rectifier configured to rectify a received radio frequency signal and output a first rectified voltage;
    a first regulator coupled to the rectifier and configured to maintain the first rectified voltage at a predetermined first voltage level;
    a second regulator coupled to the first regulator and configured to maintain a second rectified voltage at a predetermined second voltage level, the first rectified voltage differing from the second rectified voltage; and
    a signal detector coupled to the first regulator and the second regulator and configured to detect a signal component of the received radio frequency signal by generating a current determined by a difference between the first voltage level of the first rectified voltage and the second voltage level of the second rectified voltage.

2. The signal power management circuit of claim 1, wherein the first voltage level is a voltage level of a direct current (DC) component of the first rectified voltage, wherein the second voltage level is a voltage level of a DC component of the second rectified voltage, and wherein the signal detector is configured to detect the signal component of the received radio frequency signal by generating a current determined by a difference between the voltage level of the DC component of the first rectified voltage and the voltage level of a DC component of the second rectified voltage.

3. The signal power management circuit of claim 1, wherein the second voltage level is lower than the first voltage level.

4. The signal power management circuit of claim 1, further comprising:
    a switched capacitor converter coupled to the second regulator and configured to convert the second voltage level of the second rectified voltage and generate a first voltage; and
    a low-dropout (LDO) regulator coupled to the switched capacitor converter and configured to convert a voltage level of the first voltage and generate a second voltage.

5. The signal power management circuit of claim 4, wherein the first regulator is configured to block noise generated due to operation of the switched capacitor converter.

6. The signal power management circuit of claim 1, wherein the signal detector includes:
a first transistor having a first terminal coupled to the second regulator and configured to receive the second rectified voltage;
a second transistor having a gate terminal coupled with a gate terminal of the first transistor and having a first terminal coupled to the first regulator and configured to receive the first rectified voltage and generate the current determined by the difference between the first voltage level of the first rectified voltage and the second voltage level of the second rectified voltage; and
a current mirror circuit configured to mirror the current that flows through the second transistor and provide the mirrored current to a demodulator.

7. The signal power management circuit of claim 6, wherein the current mirror circuit includes:
a first current mirror circuit configured to first mirror the current that flows through the second transistor; and
a second current mirror circuit configured to second mirror a current that flows through the first current mirror circuit and provide the second mirrored current to the demodulator.

8. The signal power management circuit of claim 7, wherein the second current mirror circuit includes:
a third transistor having a first terminal coupled to the second regulator and configured to receive the second rectified voltage; and
a fourth transistor having a gate terminal coupled with a gate terminal of the third transistor and having a first terminal coupled to the second regulator and configured to receive the second rectified voltage.

9. The signal power management circuit of claim 8, wherein the first current mirror circuit includes a fifth transistor and a sixth transistor, and wherein types of the first to fourth transistors are different from types of the fifth and sixth transistors.

10. The signal power management circuit of claim 6, wherein a threshold voltage of the first transistor equals a threshold voltage of the second transistor, and wherein the signal detector generates the current determined by the difference between the first voltage level of the first rectified voltage and the second voltage level of the second rectified voltage using the first and second transistors.

11. A signal power management circuit comprising:
a rectifier configured to rectify a received radio frequency signal and output a first rectified voltage;
a first regulator coupled to the rectifier and configured to maintain the first rectified voltage at a predetermined first voltage level;
a second regulator coupled to the first regulator and configured to maintain a second rectified voltage at a predetermined second voltage level, the first rectified voltage differing from the second rectified voltage; and
a signal detector coupled to the first regulator and the second regulator and configured to detect a signal component of the received radio frequency signal by generating a first current determined by a difference between the first voltage level of the first rectified voltage and the second voltage level of the second rectified voltage;
wherein the signal detector includes:
a first transistor having a first terminal coupled to the first regulator and configured to receive the first rectified voltage generated by the first regulator;
a second transistor having a first terminal coupled to the second regulator and configured to receive a second rectified voltage generated by the second regulator and generate the first current, wherein the second transistor is configured to share a gate terminal with the first transistor;
a first current mirror circuit coupled to the second transistor and configured to perform first mirroring of the first current that flows through the second transistor and to generate a second current;
a second current mirror circuit coupled to the first mirror circuit and configured to perform second mirroring of the second current and to generate a third current; and
a demodulator coupled to the second mirror circuit and configured to receive the third current and to restore a signal component of the radio frequency signal.

12. The signal power management circuit of claim 11, wherein a threshold voltage of the first transistor equals a threshold voltage of the second transistor.

13. The signal power management circuit of claim 11, wherein the second rectified voltage is lower than the first rectified voltage.

14. The signal power management circuit of claim 11, wherein the first current mirror circuit includes a third transistor having a first terminal coupled to the second transistor and configured to receive the first current, and a fourth transistor having a gate terminal coupled with a gate terminal of the third transistor, and
wherein the second current mirror circuit includes a fifth transistor which is coupled to the fourth transistor and configured to receive the second current, and a sixth transistor having a gate terminal coupled with a gate terminal of the fifth transistor.

15. The signal power management circuit of claim 14, wherein the first, second, fifth, and sixth transistors include p-channel metal-oxide-semiconductor (PMOS) transistors, and wherein the third and fourth transistors include n-channel metal-oxide-semiconductor (NMOS) transistors.

16. A smart card comprising:
a control unit; and
a signal power management circuit configured to generate internal power from a radio frequency signal that is received from an external unit, to provide the internal power to the control unit, and to detect a signal component of the received radio frequency signal,
wherein the signal power management circuit is configured to generate from the received radio frequency signal a first rectified voltage and a second rectified voltage which is different from the first rectified voltage, and wherein the signal power management circuit is configured to detect the signal component of the received radio frequency signal by generating a current determined by a difference between a voltage level of the first rectified voltage and a voltage level of the second rectified voltage using two transistors having equal threshold voltages.

17. The smart card of claim 16, further comprising a biometric authentication sensor coupled to the signal power management circuit and configured to receive the internal power and detect biometric information of a user.

18. The smart card of claim 16, wherein the signal power management circuit includes:
a rectifier;
a first regulator coupled to the rectifier and configured to maintain the first rectified voltage at a predetermined first voltage level;

a second regulator coupled to the first regulator and configured to maintain the second rectified voltage at a predetermined second voltage level lower than the first voltage level; and a signal detector coupled to the first and second regulators and configured to receive the first rectified voltage and the second rectified voltage and detect the signal component.

19. The smart card of claim 18, wherein the signal detector includes:

a first transistor having a first terminal coupled to the second regulator and configured to receive the second rectified voltage;

a second transistor having a gate terminal coupled with a gate terminal of the first transistor and having a first terminal coupled to the first regulator and configured to receive the first rectified voltage and generate the current determined by the difference between the first voltage level of the first rectified voltage and the second voltage level of the second rectified voltage; and a current mirror circuit coupled to the second transistor and configured to mirror the current that flows through the second transistor and to provide the current to a demodulator.

20. The smart card of claim 19, wherein a threshold voltage of the first transistor equals a threshold voltage of the second transistor.

\* \* \* \* \*